United States Patent
Chenot

[15] 3,693,006
[45] Sept. 19, 1972

[54] LAMP EMPLOYING LUMINESCENT MANGANESE-ACTIVATED STRONTIUM BARIUM CHLORO-ALUMINATE PHOSPHOR COMPOSITIONS

[72] Inventor: Charles F. Chenot, Towanda, Pa.

[73] Assignee: Sylvania Electric Products Inc.

[22] Filed: June 22, 1971

[21] Appl. No.: 155,508

Related U.S. Application Data

[62] Division of Ser. No. 58,241, July 27, 1970, Pat. No. 3,649,550.

[52] U.S. Cl. .............................................. 313/109
[51] Int. Cl. .............................................. H01j 61/44
[58] Field of Search .............................. 313/109

[56] References Cited

UNITED STATES PATENTS

| | | |
|---|---|---|
| 3,012,168 | 12/1961 | Ray et al. ............. 313/109 X |
| 3,577,169 | 5/1971 | Barry ....................... 313/109 |
| 3,579,018 | 5/1971 | Ranby et al. ............ 313/109 |

*Primary Examiner*—Palmer C. DeMeo
*Attorney*—Donald R. Castle

[57] ABSTRACT

Cerium sensitized, manganese-activated strontium barium chloro-aluminate phosphor compositions are disclosed wherein the formula for the phosphor can be characterized as follows:

$$Sr_xBa_yCl_zAl_2O_{4-z/2}:Mn_uCe_w$$

wherein the sum of $x$ and $y$ is between 0.87 to about 0.95, $z$ is between about 1.03 to about 1.16, $u$ and $w$ are each from about 0.005 to 0.05. A process for producing the phosphor composition is also disclosed wherein sources of strontium, barium, chloride, aluminate, manganous and cerous ions are uniformly admixed by blending and heated under controlled temperature conditions for a time sufficient to produce the luminescent phosphor composition. Additionally, an improved lamp utilizing a cerium-sensitized, manganese-activated strontium barium chloro-aluminate phosphor is disclosed.

5 Claims, 2 Drawing Figures

PATENTED SEP 19 1972  3,693,006

INVENTOR.
CHARLES F. CHENOT
BY Donald R. Castle
ATTORNEY

LAMP EMPLOYING LUMINESCENT MANGANESE-ACTIVATED STRONTIUM BARIUM CHLORO-ALUMINATE PHOSPHOR COMPOSITIONS

CROSS REFERENCE TO RELATED APPLICATION

This application is a divisional application of Ser. No. 58,241, filed July 27, 1970, which is assigned to the assignee of the present invention, now U.S. Pat. No. 3,649,550.

BACKGROUND OF THE INVENTION

1. Field Of The Invention

This invention relates to phosphor compositions. More particularly, it relates to manganese-activated, cerium-sensitized strontium barium chloro-aluminate phosphor compositions useful in xerographic reproduction equipment.

2. Prior Art

For the present xerographic reproduction process, it is most desirable to have a phosphor which has a narrow peak emission in 5,000–5,300A region, because the characteristics of the copying devices are such that the best copies are made in that area. One of the conventionally used phosphors is zinc orthosilicate. Although this phosphor has proved adequate, it does have some major drawbacks. Namely, zinc orthosilicate has a relatively broad band emission peaking at about 5,300 A, with a half peak band width measurement of about 4,40 A.

It is believed therefore that a phosphor that has a narrow peak emission in the 5,000–5,300 A region, has a narrower band width (320 A), and a deeper green color would be an advancement in the art. It is further believed that a lamp utilizing the phosphor that can be efficiently used in a xerographic reproduction process would also be an advancement in the art.

DETAILED DESCRIPTION OF THE DRAWINGS AND PREFERRED EMBODIMENTS

For a better understanding of the preferred embodiments of the invention, together with other and further objects, advantages, and capabilities thereof, reference is made to the following disclosure and appended claims in connection with the above-described drawings.

Figure 1:
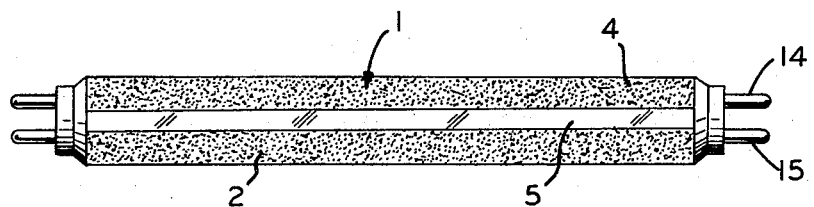
FIG. 1 is a perspective view of an aperture-type fluorescent lamp utilizing the strontium barium chloro-aluminate phosphor according to this invention.

Referring now to FIG. 1, the lamp 1 has a sealed hollow glass tube 2 containing a filling of 85 percent argon and 15 percent helium (although other suitable gas fillings can be used). On the inside surface of the glass envelope there is a coating 4 of the strontium barium chloro-aluminate phosphor. The phosphor coating 4 is shown to extend around about 315° of the circumference of the tube; the other 45°, aperture 5 of the tube is left free of phosphor coating to allow light from the phosphor to emerge therethrough..

The width of the aperture utilized in the lamp is determined by the amount of light which is desired. Thus, sizes other than the 45° above noted can be utilized, such as between 20° and 90°. The brightness in the aperture area increases as the aperture width is reduced.

At each end of the glass tube 1, there is an electrode comprising an oxide-coated tungsten coil, two auxiliary anodes and associated lead-in wires as shown, for example, in a U.S. Pat. No. 2,961,566 of John F. Waymouth et al. for a fluorescent lamp. A usual insulating plastic base with the base carrying contacts 14 and 15, can be as shown, for example, in U.S. Pat. No. 2,896,187, issued July 21, 1959 to R. B. Thomas and E. C. Shappell, for a lamp base, or some suitable base can be used.

The phosphor coating can be applied at first over the entire glass envelope by methods well known in the art, and then scraped and brushed off from the aperture 5 of the glass tube 2, as desired.

Figure 2:
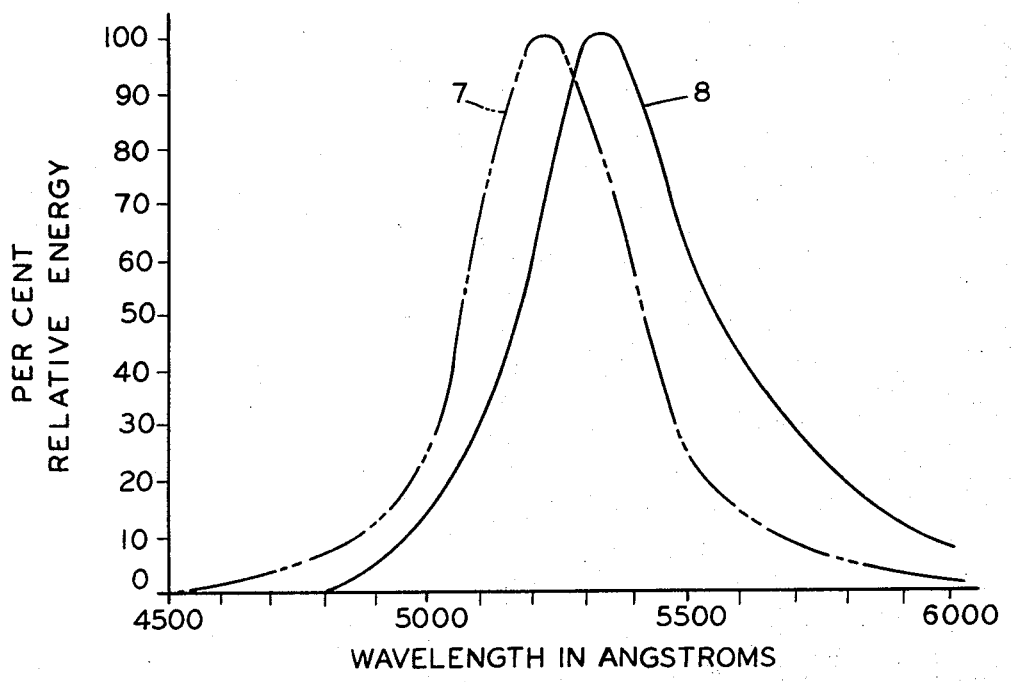
FIG. 2 compares the emission spectrum of the strontium barium chloro-aluminate phosphor of this invention that is activated by manganese and sensitized by cerium with that of the conventionally used zinc orthosilicate phosphor.

Referring now to FIG. 2, the emission spectral energy distribution of the strontium barium chloro-aluminate phosphor activated by manganese and sensitized by cerium 7 is compared with that of the conventionally used zinc orthosilicate phosphor activated by manganese 8. The spectral energy distribution curves are both normalized to 100.

For the present xerographic reproduction process, it is most desirable to have a phosphor which has a narrow peak emission in the 5,000 A to 5,300 A region, because the characteristics of the copying devices are such that the best copies are made in that area.

As is seen in FIG. 2, the strontium barium chloro-aluminate has a relatively sharper emission of narrower band width (320 A) than the conventionally used zinc orthosilicate (440 A).

It has been found that strontium barium chloro-aluminate phosphor activated by manganese and sensitized by cerium is represented by the formula

$$Sr_xBa_yCl_zAl_2O_{4-z/2}:Mn_uCe_w$$

wherein the sum of $x$ and $y$ is between about 0.87 to about 0.95, $z$ is between about 1.08 to about 1.16, $u$ and $w$ are each from about 0.005 to about 0.05, and the ratio of said strontium and said barium ($x+y$) to said aluminate radical ($Al_2O_{4-z/2}$) is 9.16:10. Especially preferred values for $u$ and $w$ are each about 0.01. When greater than the upper limits or less than the lower limits of $x$, $y$, $z$, $w$, and $u$ previously specified are used, the phosphor will not fluoresce appreciably and the emission will be shifted.

In the process of this invention, it has been found that hydroxides are the preferred strontium barium and aluminum sources not provided by the chloride source as hereinafter mentioned. Oxalates, acetates, and carbonates can be used; however, they generally yield carbon and can produce inferior phosphors. Nitrates can be used, but nitrate glasses form and resultant foaming can cause major handling problems. In practice, hydrated hydroxides are especially preferred.

Anhydrous barium chloride is the preferred source for the chloride ion, but other sources such as strontium chloride and ammonium chloride can be used as well, with appropriate compensation adjustments in the other constituents as well.

Aqueous solutions as well as dry mix can be used to furnish the activator in the +2 valence state, and especially preferred is about a 45 to 55 percent by weight solution of manganous nitrate. A solution yields better dispersion of the manganous-containing component with the other constituents and is, therefore, preferred.

Comparable results can be obtained when other manganese sources such as manganous carbonate and manganous chloride are used.

Likewise, it is preferred to use about a 42 percent by weight to about a 50 percent by weight solution of cerous nitrate. An advantage of the cerous state is to furnish a sensitizer in the +3 valence state. Dry mixes and other cerium sources, such as, ceric oxide and cerous chloride can be used, however, cerous nitrate is preferred.

An admixture of the foregoing sources is prepared by suitable blending, such as wet blending with acetone, by blending in a ball-mill, etc., to obtain a uniform admixture.

The mixture is then heated for about five hours at a temperature of less than about 400° C, and thereafter heated in a reducing atmosphere at a temperature of from about 1,100° C to about 1,200° C for a time sufficient to form the phosphor that has the aforementioned properties.

One of the preferred preparation techniques is to heat the mixture for about 3 to about 5 hours in air at about 160° C, thereafter cool the resultant mixture to atmospheric temperature, reblend the mixture, heat the mixture for about 3 to about 5 hours in air at less than about 400° C. The mixture is then heated for about 2 to about 4 hours under a reducing atmosphere, preferably about 0.01 to about 0.05 percent hydrogen in nitrogen, at a temperature of about 1,100° C to about 1,200° C for about 2 to about 4 hours, cooled to atmospheric temperature, screened through a U.S. sieve 100 mesh screen and heated for an additional 2 to about 4 hours at about 1,100° C to about 1,200° C, and under a reducing atmosphere, preferably containing below about 5 percent hydrogen in nitrogen.

The two preliminary heating steps remove the waters of hydration from the hydroxides. Although not necessary for the production of the phosphor, heating can help in the handling of the mixture, as the waters of hydration can be removed quite rapidly. Although a weak luminescence is developed after the first heating at about 1,100° C to about 1,200° C, a second heating is necessary to develop an efficient phosphor.

To further illustrate the invention, the following detailed examples are given. All parts, proportions and percentages are by weight unless otherwise given.

EXAMPLE 1

The phosphor starting components in the form of powders and the activator components in the form of standard solutions are wet blended in acetone for about 15 minutes in the molecular proportions:

| | |
|---|---|
| $Sr(OH)_2 \cdot 8H_2O$ | 0.229 moles |
| $Ba(OH)_2 \cdot 8H_2O$ | 0.125 " |
| $BaCl_2$ (anhydrous) | 0.563 " |
| $Al(OH)_3$ | 2.000 " |
| $Mn(NO_3)_2$ (52% solution) | 0.010 " |
| $Ce(NO_3)_3$ (47.5% solution) | 0.010 " |

The admixture is dried at about 160° C for about 5 hours, and then reblended and refired at under about 400° C for about 5 hours. The admixture is then fired in suitable boats at a temperature of from about 1,100° C to about 1,200° C for about 4 hours, in a nitrogen atmosphere containing 0.4 percent hydrogen. After cooling to atmospheric temperature, the admixture is screened through 100 mesh screen and refired at a temperature of from about 1,100° C to about 1,200° C for about 4 hours, in a nitrogen atmosphere containing about 4 percent hydrogen.

As is seen from FIG. 2, the strontium barium chloroaluminate phosphor has a relatively sharper emission of narrower half width (320 A) than the conventionally used zinc orthosilicate (440 A).

EXAMPLE 2

An aperture-type fluorescent lamp is made by standard procedures, using material produced in Example 1. The resultant lamp when excited by 2,537 A radiation efficiently emits light in a relatively narrow region of the visible spectrum at 5,120 A.

While there has been shown and described what is at present considered the preferred embodiments of the invention, it will be obvious to those skilled in the art that various changes and modifications may be made therein without departing from the scope of the invention as defined by the appended claims.

What is claimed is:

1. An electrical discharge device comprising:
   a. a pair of electrodes;
   b. a glass envelope disposed about and sealed to said electrodes;
   c. a fill of mercury disposed within said envelope; and
   d. a coating of a luminescent phosphor composition, consisting essentially of strontium barium chloroaluminate phosphor activated by manganese and sensitized by cerium, having the formula $$Sr_xBa_yCl_zAl_2O_{4-z/2}:Mn_uCe_w$$

wherein the sum of $x$ and $y$ is between about 0.87 to about 0.95, $z$ is between about 1.08 to about 1.16, $u$ and $w$ are each from about 0.005 to about 0.05, and the ratio of said strontium and said barium $(x+y)$ to said aluminate radical, $Al_2O_{4-z/2}$, 9.16:10, disposed upon the internal surface of said envelope.

2. A device according to claim 1, wherein said composition $x$ is between about 0.21 to about 0.25.

3. A device according to claim 2, wherein said composition $u$ is about 0.01.

4. A device according to claim 3, wherein in said composition $w$ is about 0.01.

5. The device according to claim 4, wherein said internal surface of said envelope has an uncoated portion, thereby leaving a clear glass slit for light to emerge therethrough.

* * * * *

PO-1050
(5/69)

UNITED STATES PATENT OFFICE
CERTIFICATE OF CORRECTION

Patent No. 3,693,006          Dated    September 19, 1972

Inventor(s)    CHARLES F. CHENOT

It is certified that error appears in the above-identified patent and that said Letters Patent are hereby corrected as shown below:

Re [57] ABSTRACT, Line 7, "1.03" should read --- 1.08 ---

Signed and sealed this 27th day of March 1973.

(SEAL)
Attest:

EDWARD M. FLETCHER, JR.          ROBERT GOTTSCHALK
Attesting Officer               Commissioner of Patents